United States Patent
Fuller et al.

(10) Patent No.: US 6,704,650 B1
(45) Date of Patent: Mar. 9, 2004

(54) TECHNIQUE FOR ACCURATE DISTANCE AND VELOCITY CALCULATIONS USING THE GLOBAL POSITIONING SYSTEM (GPS)

(75) Inventors: Richard A. Fuller, Los Gatos, CA (US); Roger Hayward, San Francisco, CA (US); Jock Christie, Mountain View, CA (US)

(73) Assignee: SkyNetix, LLC, Long Beach, CA (US)

( * ) Notice: Subject to any disclaimer, the term of this patent is extended or adjusted under 35 U.S.C. 154(b) by 0 days.

(21) Appl. No.: 09/872,767

(22) Filed: May 31, 2001

Related U.S. Application Data

(60) Provisional application No. 60/208,960, filed on May 31, 2000.

(51) Int. Cl.[7] .............................................. G01C 21/00
(52) U.S. Cl. ....................... 701/213; 701/214; 701/208; 342/357.01; 342/357.09
(58) Field of Search ................................. 701/213, 214, 701/216, 208, 215; 342/357.01, 357.09

(56) References Cited

U.S. PATENT DOCUMENTS

| | | | |
|---|---|---|---|
| 5,420,592 A | * | 5/1995 | Johnson ................. 342/357.12 |
| 5,504,492 A | * | 4/1996 | Class et al. ............ 342/357.06 |
| 5,953,367 A | * | 9/1999 | Zhodzicshsky et al. ..... 375/147 |
| 6,215,441 B1 | * | 4/2001 | Moeglein et al. ...... 342/357.01 |
| 6,427,122 B1 | * | 7/2002 | Lin ............................. 701/214 |

\* cited by examiner

*Primary Examiner*—Marthe Y. Marc-Coleman
(74) *Attorney, Agent, or Firm*—Townsend and Townsend and Crew LLP

(57) ABSTRACT

A method of determining the distance traveled during an event by a mobile GPS receiver. The event comprises epochs. The method comprises receiving pseudorange data comprised of one of pseudorange differences or range rates. Each pseudorange difference, in turn, comprises a difference between a first pseudorange and a second pseudorange. The first pseudorange comprises the pseudorange between the receiver and a GPS satellite at a first epoch. The second pseudorange comprises the pseudorange between the receiver and the GPS satellite at a second epoch. The range rates comprise a range rate measurement taken by the receiver of the GPS satellite from the first epoch to the second epoch. Line-of-sight data comprised of at least one normalized vector between the receiver and the GPS satellite is then determined. Based on the pseudorange and line-of-sight data, incremental distance data is then determined. A sum over the event of the incremental distance data is then determined.

22 Claims, 2 Drawing Sheets

TECHNIQUE FOR ACCURATE DISTANCE AND VELOCITY CALCULATIONS USING THE GLOBAL POSITIONING SYSTEM (GPS)

CROSS-REFERENCES TO RELATED APPLICATIONS

This application claims the benefit of U.S. provisional patent application serial No. 60/208,960 filed May 31, 2000 which is hereby incorporated herein by reference in its entirety.

BACKGROUND OF THE INVENTION

User GPS receiver architectures vary widely and can supply a wide variety of measurements in addition to pseudorange and continuous carrier phase, the two primary characteristic measurements from GPS. Pseudorange, $\rho_u^k$ from Equation (1) below, is the receiver measurement of the geometric range to the satellite with degradation from satellite and receiver clock errors, the atmosphere and receiver errors. The second primary measurement of the receiver is the continuous carrier phase, $\phi_u^k$ in Equation (2) below. Continuous carrier phase shares the same degradation factors as the pseudorange, but an additional uncertainty is added since the wavelength of the carrier is only 19 centimeters and has an integer ambiguity that is difficult to resolve in real-time.

As implied by Equations (1) and (2), a number of factors conspire to corrupt the pseudorange and carrier phase measurements for GPS. These errors are summarized below.

$$\rho_u^k = r_u^k \cdot 1_u^k + b_u - B^k + I_u^k + T_u^k + v_u^k \qquad (1)$$

$$\phi_u^k = r_u^k \cdot 1_u^k + b_u - B^k + I_u^k + T_u^k + N_u^k \lambda_{L1} + \xi_u^k \qquad (2)$$

where $\rho_u^k$ = the pseudorange from the user receiver, u, to the $k^{th}$ satellite $\phi_u^k$ = the continuous carrier phase from the user receiver, u, to the $k^{th}$ satellite $1_u^k$ = the line-of-sight from the user receiver, u, to the $k^{th}$ satellite $r_u^k \cdot 1_u^k$ = the calculated range from the user receiver, u, to the $k^{th}$ satellite $b_u$ = the user receiver clock offset from GPS time $B^k$ = the $k^{th}$ satellite clock offset from GPS time $I_u^k$ = the ionospheric delay along the line-of-sight from the user receiver, u, to the $k^{th}$ satellite $T_u^k$ = the tropospheric delay along the line-of-sight from the user receiver, u, to the $k^{th}$ satellite $N_u^k$ = the continuous phase cycle ambiguity from the user receiver, u, to the $k^{th}$ satellite $\lambda_{L1}$ = the L1 carrier phase wavelength, 0.1903 meters $v_u^k$ = the pseudorange measurement error $\xi_u^k$ = the carrier phase measurement error Clock errors are mostly due to the degradation associated with Selective Availability (SA). This intentional degradation corrupts the range accuracy by values up to several tens of meters. Studies shown it reasonable to assume that the overwhelming majority of SA errors are from clock perturbations. The US Government deactivated SA on May 2, 2000, indicating that it will not be enabled again.

Ionospheric delay is caused when the GPS signal encounters the ionosphere. The carrier wave is advanced while the code phase is delayed. These effects are partially corrected for the single-frequency user by the Klobuchar ionospheric parameters broadcast in the GPS message itself. Dual frequency receivers can, for the most part, remove these effects directly.

Tropospheric delay can be up to 30 meters for low elevation satellites due to GPS signal propagation through the lower atmosphere (troposphere). There are two primary components of the tropospheric delay, dry and wet. The dry component makes up about 90% of the total delay and can be modeled well with surface pressure data. The wet component is much more difficult to model and not well correlated with surface conditions. The wet term can add as much as 2–3 meters of uncorrected error on the GPS measurements.

Ephemeris errors occur when the reported satellite position does not match the actual position. The component of these errors along the line of sight to the user is usually less than a few meters.

Multipath errors are due to local reflections of the signal near the receiver and are tracked with delay, corrupting the range and phase measurements. These effects are very sensitive to the local environment. Tall buildings are the most commonly encountered source of the reflections that cause multipath interference.

Receiver noise is comprised of thermal noise, signal and modeling quantization. These errors are usually limited to about 1 meter for pseudorange and 1 mm for carrier phase.

Since many of the above-discussed errors are common-mode for receivers that are sufficiently proximal to one another, it is possible to use measurements from one GPS receiver at a known reference location to correct the measurements of the nearby "mobile" receiver (a mobile receiver may be in motion or stationary; "mobile" is meant to indicate its usual location being unfixed with respect to the earth's surface). At the limit, for two receivers that share the same antenna, the only residual errors that would remain are due to receiver noise.

Using GPS measurements from one or more GPS receivers to correct another GPS receiver is called differential GPS (DGPS). Every DGPS system contains three system elements: 1) a single receiver or multiple GPS receivers at known reference (fixed) locations; 2) a mobile (unfixed) receiver; and 3) a communication link between the reference receiver(s) and the mobile unit.

Local-Area Differential GPS consists of a single reference station (a GPS receiver) at a known location measuring the errors in the pseudorange and broadcasting pseudorange corrections to mobile receiver users or a data processing and storage system via a data link. Other measurements and information from the satellites may also be received by the local-area differential GPS reference station and transmitted via the data link. Such other measurements/information includes the satellite almanac, ephemeris, carrier phase, pseudodoppler (commonly referred to as Doppler measurements or range rate), phase bias, frequency bias, clock offset, signal strength, local angles of elevation and azimuth, and others. The operating presumption is that errors observed by a mobile user are nearly identical to those observed by a nearby reference receiver. Errors typically excepted from this presumption are local phenomena such as multipath and receiver noise. In the extreme case where the location of the mobile unit and the reference station are the same, all error sources except for multipath and receiver noise cancel out.

Local-area differential GPS can reduce position errors to as little as 0.5 meters (with smoothing). However, local-area differential GPS systems suffer from a high sensitivity to the proximity of the user to the reference station. Beyond a separation of, typically, 100 kilometers the solution degrades to an unacceptable degree. As such, for functionally acceptable DGPS corrections to be available over the entire Coterminous United States (CONUS), over 500 stations are required.

The use of wide-area differential GPS for the aviation community is currently under development by the FAA and is called the Wide Area Augmentation System (WAAS). The data link employed by this system is a geostationary satellite, which has a semi-major axis of 42,000 km and a nearly zero degree inclination. The major advantage of this satellite orbit configuration is that it is synchronous with the rotation of the Earth and, therefore, is at all times in a practically fixed position relative to mobile receiver users and reference stations.

The principle behind wide-area differential GPS is the use of multiple GPS reference stations to form "vector" corrections for each satellite in view of all or a subset of the GPS reference stations. The vector corrections are broken down into the components of the error sources to GPS. In a wide-area differential GPS system, the corrections include satellite ephemeris, satellite clock and the ionosphere. As in local-area differential GPS systems, multipath errors and receiver noise are not corrected, as these are purely local phenomena related exclusively to the mobile unit. The vector corrections are formed by making simultaneous measurements at multiple reference stations of the same GPS satellite observables. Observables that are recorded at the reference stations include pseudorange, pseudodoppler, carrier phase, and signal levels. Once the corrections are formulated, they are transmitted to geostationary satellites that re-broadcast the corrections to mobile users tracking the geostationary satellite. The mobile user tracks both the GPS satellites and the geostationary satellites and can thus derive pseudorange measurements not only from the GPS satellites but also the geostationary satellite. While the resultant GPS measurements, assisted by the broadcast corrections from the geostationary satellites, are more accurate, additional range sources may be used to supplement GPS. However, the vector corrections from the system are only available through the geostationary satellite. The wide-area system under development by the FAA is a "closed" system meaning that the measurements are not directly available to mobile receiver users.

It is well known in the art that stand-alone GPS receivers are prone to a number of errors, some natural and some man-made, as discussed above. These errors generally delay the arrival of the signals in space, resulting in errors in the measured position of the receiver. These position errors make all subsequent dependent measurements, such as elapsed distance or instantaneous velocity, inaccurate. The United States Department of Defense (DoD) has routinely used Selective Availability (SA) to degrade position accuracy for civilian users of GPS. Although, as discussed above, SA was disabled in early May 2000, the inherent natural errors in the system still require corrective measures. Measurements of position, elapsed distance, or velocity based on stored waypoints are inherently inaccurate. In particular the accuracy (in terms of percentage, not magnitude) of these measurements is worse at lower speeds. Cyclists (~10 to 20 m/s), for example, suffer smaller errors than pedestrians (~1 or 2 m/s). Poor satellite visibility due to dynamic motion (e.g., while running) can further decrease accuracy and increase the need for corrective measures.

The previously employed technique for elapsed distance measurement was to take the absolute distance between two measured GPS waypoints. The elapsed distance measurement produced by this technique is consistently and inaccurately high, and can be significantly wrong if there is a satellite set switch (constellation change) as depicted in FIG. 1. The technique is especially error prone in the case of slow speeds, as shown in FIG. 2 and discussed below in further detail, and/or the presence of SA.

A system that provides accurate measurement of elapsed distance and instantaneous velocity is valuable to both commercial and recreational users. Differential GPS (DGPS), including both the Local-Area and Wide-Area systems discussed above, utilizes pseudorange corrections to improve accuracy. However, DGPS receivers are typically larger and more expensive. Accordingly, what is needed in the art are calibration techniques that allow for precise elapsed distance and instantaneous velocity measurements in real time without the required use of differential corrections.

BRIEF SUMMARY OF THE INVENTION

In accordance with principles of the present invention, a method is disclosed of determining the distance traveled during an event by a mobile GPS receiver. The event comprises a plurality of epochs.

In a preferred embodiment, the method comprises receiving pseudorange data comprised of one of pseudorange differences or range rates. Each pseudorange difference, in turn, comprises a difference between a first pseudorange and a second pseudorange. The first pseudorange comprises the pseudorange between the receiver and a GPS satellite at a first epoch of the plurality of epochs. The second pseudorange comprises the pseudorange between the receiver and the GPS satellite at a second epoch of the plurality of epochs. The range rates comprise a range rate measurement taken by the receiver of the GPS satellite from the first epoch to the second epoch. Line-of-sight data comprised of at least one normalized vector between the receiver and the GPS satellite is then determined. Based on the pseudorange and line-of-sight data, incremental distance data is then determined. This determination comprises determining a linear algebraic solution of the pseudorange and line-of-sight data. The linear algebraic solution determination yields one of receiver position difference data or three-dimensional velocity data. This determination further comprises determining a root mean square of the receiver position difference data or three-dimensional velocity data. A sum over the event of the incremental distance data is then determined.

These functions are typically initiated and/or performed by software code modules stored in a memory associated with and executing on a processor.

DETAILED DESCRIPTION OF THE INVENTION

The following equations show details for solving for elapsed distance directly from pseudorange measurements for improved accuracy. Equation 3 illustrates principles of the preferred embodiment of the present invention for obtaining an incremental distance d from pseudoranges at two epochs of a user-defined event. In the preferred embodiment, pseudorange differences associated with a constant satellite set (minimum set) are used to compute incremental distances directly, and the incremental distances are summed over the entire event to produce elapsed distance for the event. The preferred embodiment requires a common set of satellites from epoch to epoch and is more effective in situations where the receiver is traveling a steady course (e.g., linear, curvilinear motion, etc.) and the velocity while on this course varies by more than 25%. Further, employment of this preferred embodiment is most effective when there is a relatively long time (30 seconds or more) between measurements leading to position fixes (position computations) since long, straight paths with little velocity variation will enable lower sampling rates supporting precise elapsed distance.

Figures 4, 5:
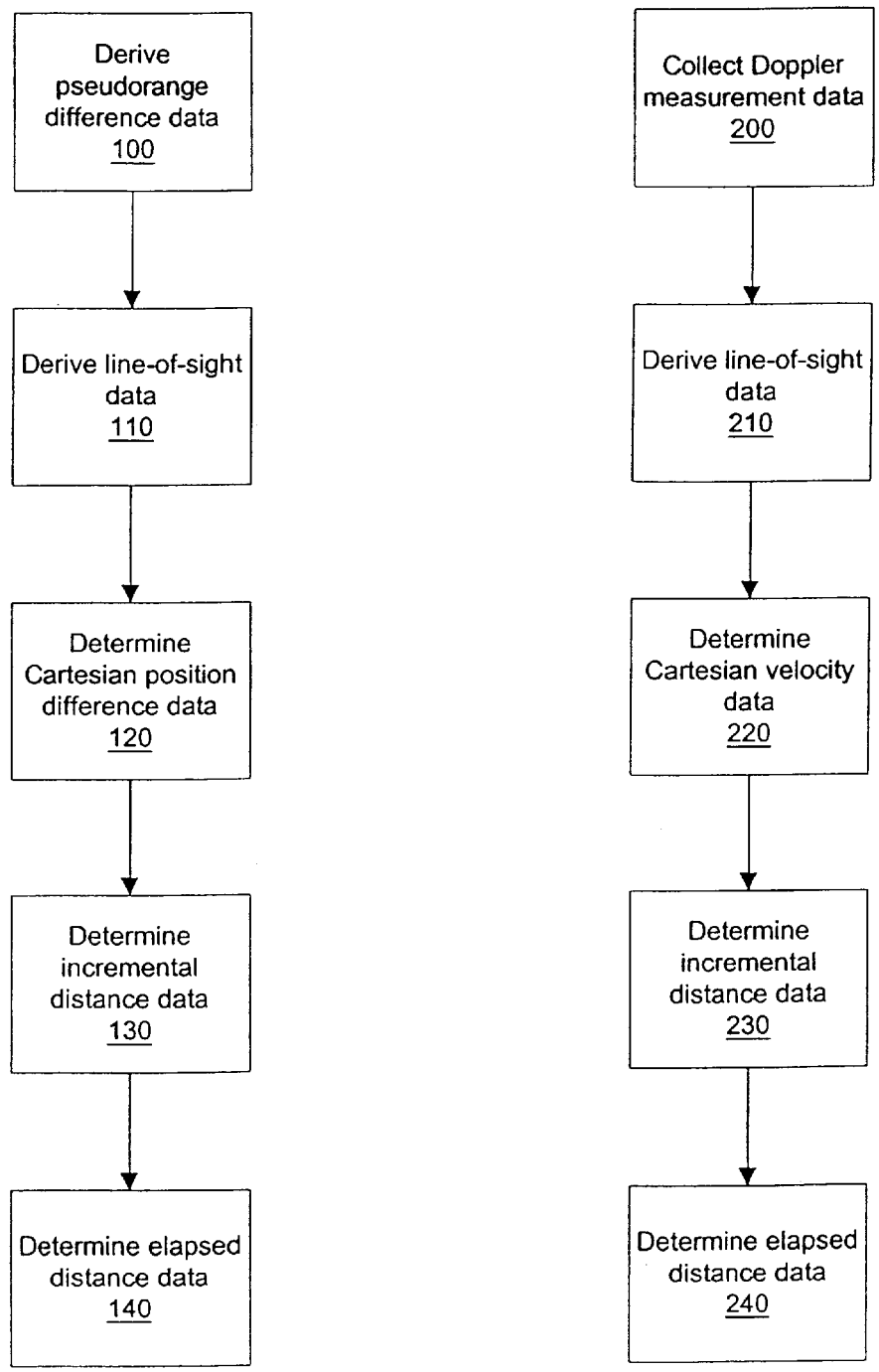
FIG. 4 is a flow chart illustrating a method, according to a preferred embodiment of the present invention, of deriving the elapsed distance from two epochs of pseudorange measurement data.
FIG. 5 is a flow chart illustrating a method, according to a first alternative embodiment of the present invention, of deriving the elapsed distance from velocity measurements integrated over time.

Performance of the preferred embodiment is best illustrated in FIG. 4 and employs the principles illustrated in Equation 3. Each superscript in Equation 3 represents a corresponding satellite in the set used for the solution. At step 100 pseudorange measurements at two distinct epochs are collected and the respective differences in these measurements are determined. At step 110, line-of-sight data (los) is derived. The line of sight is the normalized vector between the user and the satellite position for each of the three Cartesian dimensions, XYZ.

The pseudorange differences are represented by $\Delta\bar{\phi}$ in Equation 3 and the three-dimensional Cartesian position difference is represented by $\Delta X$, $\Delta Y$ and $\Delta Z$ in Equation 3. The state representing the clock offset from GPS time is given by $\beta$. This clock offset is a by-product of the calculation process and is not used in the elapsed distance calculation. At step 120, and as further illustrated in Equation 3, the pseudoinverse of the linear equations, including line-of-sight matrix G, is taken to determine the Cartesian position differences $\bar{X}$ from the differences in the pseudoranges $\Delta\bar{\phi}$. While the elapsed distance calculations described herein preferably employ a pseudoinverse of the applicable linear equations, it should be noted that such calculations may be obtained by employing any appropriate alternative linear algebraic operation known in the art.

At step 130, the incremental distance d is found by combining the Cartesian position differences in a root mean square fashion. The time difference between the epochs is arbitrary, but as stated above this calculation will be most accurate when the course traveled during the incremental distance is along a constant path but at varying velocities. At step 140, for an event comprising m epochs, the incremental distances d are summed together to form the elapsed distance ED.

$$\begin{bmatrix} \Delta\phi^1 \\ \Delta\phi^2 \\ \vdots \\ \Delta\phi^n \end{bmatrix} = \begin{bmatrix} los_X^1 & los_Y^1 & los_Z^1 & 1 \\ los_X^2 & los_Y^2 & los_Z^2 & 1 \\ \vdots & \vdots & \vdots & 1 \\ los_X^n & los_Y^n & los_Z^n & 1 \end{bmatrix} \begin{bmatrix} \Delta X \\ \Delta Y \\ \Delta Z \\ \beta \end{bmatrix} \quad (3)$$

$$\Delta\bar{\phi} = G\bar{X}$$

$$\bar{X} = [G^T G]^{-1} G^T \Delta\bar{\phi}$$

$$d = \sqrt{\Delta X^2 + \Delta Y^2 + \Delta Z^2}$$

$$ED = \sum_1^m d_m$$

In a first alternative embodiment of the present invention, a similar approach using Doppler (range rate) measurements is shown in Equation 4. In this embodiment, the range rate measurements for the entire event are integrated (summed) to produce elapsed distance for the event. This alternative embodiment does not involve any requirements pertaining to the set of satellites and has the greatest accuracy when the course varies widely (e.g., sharp turns, switchbacks, etc.) but the velocity is relatively constant (less than 25% variation). Further, this approach is most effective when the time between measurements leading to position or velocity fixes is small (0.001 seconds to 5 seconds).

Performance of the first alternative embodiment is best illustrated in FIG. 5 and employs the principles illustrated in Equation 4. Each superscript in Equation 4 represents a corresponding satellite in the set used for the solution. At step 200 Doppler measurements associated with two distinct epochs are collected. At step 210, line-of-sight data (los) is derived. As in the preferred embodiment discussed above, the line of sight is the normalized vector between the user and the satellite position for each of the three Cartesian dimensions, XYZ.

The Doppler measurements are represented by vector $\bar{\phi}$ and the Cartesian velocities are represented by vector $\bar{X}$ in Equation 4. The GPS clock rate offset term, $\dot{\beta}$, is also determined in this process but is not utilized in the incremental distance calculation. At step 220, and as further illustrated in Equation 4, the pseudoinverse of the linear equations, including line-of-sight matrix G, is taken to determine the Cartesian velocity data $\bar{X}$ from the Doppler measurements $\bar{\phi}$. While the elapsed distance calculations described herein preferably employ a pseudoinverse of the applicable linear equations, it should be noted that such calculations may be obtained by employing any appropriate alternative linear algebraic operation known in the art.

At step 230, the incremental distance d is found by combining the Cartesian velocity data in a root mean square fashion. A $\Delta t$ (time difference) between samples is employed to convert the velocity to incremental distance d since the previous epoch. At step 240, for an event comprising m epochs, the incremental distances d are summed together to form the elapsed distance ED.

$$\begin{bmatrix} \dot{\phi}^1 \\ \dot{\phi}^2 \\ \vdots \\ \dot{\phi}^n \end{bmatrix} = \begin{bmatrix} los_X^1 & los_Y^1 & los_Z^1 & 1 \\ los_X^2 & los_Y^2 & los_Z^2 & 1 \\ \vdots & \vdots & \vdots & 1 \\ los_X^n & los_Y^n & los_Z^n & 1 \end{bmatrix} \begin{bmatrix} \dot{X} \\ \dot{Y} \\ \dot{Z} \\ \dot{\beta} \end{bmatrix} \quad (4)$$

$$\bar{\dot{\phi}} = G\bar{\dot{X}}$$

$$\bar{\dot{X}} = [G^T G]^{-1} G^T \Delta\bar{\dot{\phi}}$$

-continued $$d = \Delta t \sqrt{\dot{X}^2 + \dot{Y}^2 + \dot{Z}^2}$$

$$ED = \sum_{1}^{m} d_m$$

The advantage of the alternative embodiment, as shown in Equation 4, is the use of range rate measurements which are relatively less noisy than pseudorange measurements (by as much as a factor of 1000 for time intervals less than a second).

Pseudorange measurements are used as described in Equations 3 and 4 to directly compute performance information (elapsed distance and velocity) without the need for computing or storing waypoints. By storing pseudorange measurements rather than waypoints, it is possible to apply differential corrections after event conclusion which subsequently further reduce errors for the derived values of elapsed distance and velocity.

Ideally, a combination of the two techniques would be used for optimal performance. This combination would be accomplished in two steps. First, the incremental distances would be classified by their path and velocity variations. Second, the classification would be used to select the appropriate method to apply to that incremental distance. The classification of the path and velocity variations will use the standard position and velocity calculations present in the receiver. These observations would be used to determine which of the two calculations to apply for a given incremental distance. For an incremental distance of the event where the velocity variation is large, the first technique would be applied; for another incremental distance the second technique would be applied if the velocity variation was small. Alternatively, the two measurements could be weighted and combined at each epoch based on some figure of merit of how much variation in the path or velocity is observed.

Figure 1:
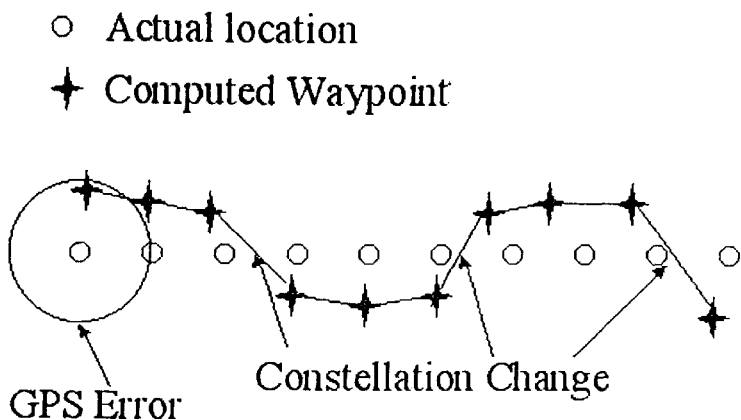
FIG. 1 is a schematic illustration of position errors associated with a satellite set switch.
Figure 2:
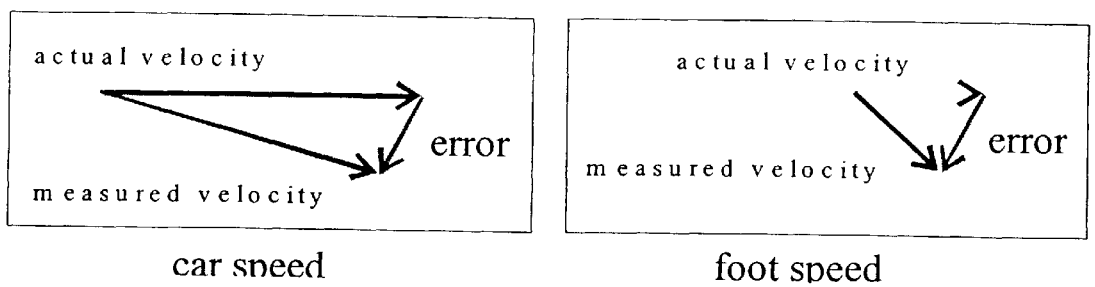
FIG. 2 is a schematic illustration of position errors associated with relatively slow movement of a mobile receiver.

In a second alternative embodiment of the present invention, a distance correction factor (for any elapsed distance calculation according to Equations 3 and 4 above) may be calculated based on elapsed time and known noise characteristics of GPS error sources. This embodiment can supplement the above-discussed embodiments to further improve accuracy. FIG. 2 illustrates the effect associated with computing elapsed distance as a function of velocity (i.e., speed). This is the principle behind the correction factor of this second alternative embodiment. The velocity uncertainty or error is of the same magnitude in both cases. However, due to the slow speed of the mobile receiver when carried, for example, on foot, the error is greater as a percentage of actual and measured velocity than is the case when the receiver is carried, for example, in an automobile. In fact, as the speed approaches zero the fractional distance error, as a percentage of actual and/or measured velocity, grows dramatically because the magnitude of the uncertainties remains fixed regardless of speed. By modeling these uncertainties, the cumulative error is reduced. Additionally, as the total run time increases the fractional distance error decreases.

To model the uncertainties, their causes must be understood. The position errors are due to many factors. These include the effects of the ionosphere (upper atmosphere free electrons), troposphere (lower atmosphere refractive media), SA (intentional degradation of the GPS signal), multipath (local reflections of the signal) and receiver noise (errors in measuring the signal). Each of these error sources have different magnitudes and time-constants. Until the beginning of May 2000, SA was the worst GPS error since it had a large magnitude (up to 100 meters in horizontal positioning) and a short time-constant (a few minutes). However, with the recent deactivation of SA, the major error sources for GPS receivers on the ground (or on someone's body) are due to the ionosphere, multipath and receiver noise. (The residual troposphere, after removing modeled errors, is small and has a slow time-constant and thus can be disregarded.) Each of these terms has a characteristic magnitude and time-constant.

The ionosphere has a very slow time-constant. The ionosphere rotates roughly with the Earth so its period is measured over a day in length. GPS broadcasts a model for the ionosphere that can correct up to 60% of the errors. The uncorrected errors can cause as much as 30 meters of horizontal position error, however it is usually limited to 10–20 meters. Due to the slow time-constant, the rate of change of the error is small and contributes very little to the integrated-velocity distance calculation error over the normal course of a run or modest bike ride (1–2 hours).

Multipath is a different story. This term is caused by local reflections of the signal so it is highly dependent on the environment and the time-of-day (different directions to the satellites). Multipath can contribute as little as a few meters of error in horizontal positioning, up about 20 meters of error. This term will have to be user-specific and will either have to be calibrated for a given event or pre-programmed for the type of environment (i.e. open field, tree-lined streets, urban canyon, etc.).

The last major term is receiver noise. Receiver noise is influenced by many factors related to receiver design, both hardware and software. Depending on the hardware design and the use of the receiver, the errors for receiver noise for horizontal positioning can vary from less than a meter up to 20 meters. However, the errors for receiver noise are the easiest to calibrate and predict.

These three effects are modeled separately in the receiver (and correction) software. The ionosphere is modeled as a first-order Markov process with a drift rate of approximately 2 centimeters/second. Multipath is modeled as a second-order Markov process with adjustable time constants and magnitudes to account for the varying conditions that the mobile receiver will encounter. Finally, the receiver noise is modeled as a function of two independently distributed random variables that simulate the variation both in magnitude and as direction of the position disturbance.

The estimates of these models are combined to project error growth in the user's elapsed distance over time. Along with this estimate will be a confidence factor of the estimate assuming that the models fit well to the environment (i.e., the assumptions made regarding the ionospheric variations, multipath disturbances and the receiver errors are known). Equation 5 gives this covariance model for a generic Markov process. Details of Markov processes and their application are given in Leon-Garcia, A., *Probability and Random Processes for Electrical Engineers*, 2nd Edition, Addison Wesley, 1997. For this application, the $P^+$ represents the current covariance matrix of the velocity error estimate and $P_-$ is the estimate from the previous epoch. $\Phi$ is state-transition matrix that propagates state information from one epoch to the next. In this case the state information is receiver velocity information and the relationship between epochs is derived from the time-correlations from the error sources described above; specifically the ionosphere, clock, troposphere and multipath. $C_D$ represents errors in the signal that are completely random. This term is primarily related to receiver noise.

$$P^+=\Phi P^-\Phi^T+C_D$$

$$\Delta d=\alpha\cdot\Delta t\cdot\|P^+\| \quad (5)$$

The covariance matrix represents the confidence in the velocity estimate. Uncertainty in the velocity will lead to uncertainty in position. Velocity is first integrated to produce incremental distance and then summed a second time to produce elapsed distance. The uncertainty from one epoch to another does not cancel itself out; the uncertainty, and therefore the error, in distance will build up as the velocity is integrated. A larger $P^+$ will lead to higher elapsed distance divergence. Therefore, by taking the 2-norm (as explained in Golub, G. H., Van Loan, C. F., *Matrix Computations,* Third Edition, John Hopkins University Press, 1996) of $P^+$ and integrating the velocity uncertainty, a proportional estimate of the divergence of the elapsed distance can be formed. In Equation 5, the term Ad represents the divergence of the distance difference during the time, $\Delta t$. The value of $\alpha$ is a factor to compensate for the fact that velocity errors are not fully correlated to the direction that an elapsed distance is traveled. This fact is represented in FIG. 2 where the velocity error vector can be oriented in a random direction, either with or against the direction of the course. Velocity errors along the direction of travel, more so than errors perpendicular to the direction of travel, will influence the incremental distance. The $\alpha$ term is derived from the current velocity and the expected velocity error. The $\alpha$ term is always greater than zero and less than or equal to one. The calibration of this second alternative embodiment significantly reduces errors at lower speeds.

Figure 3:
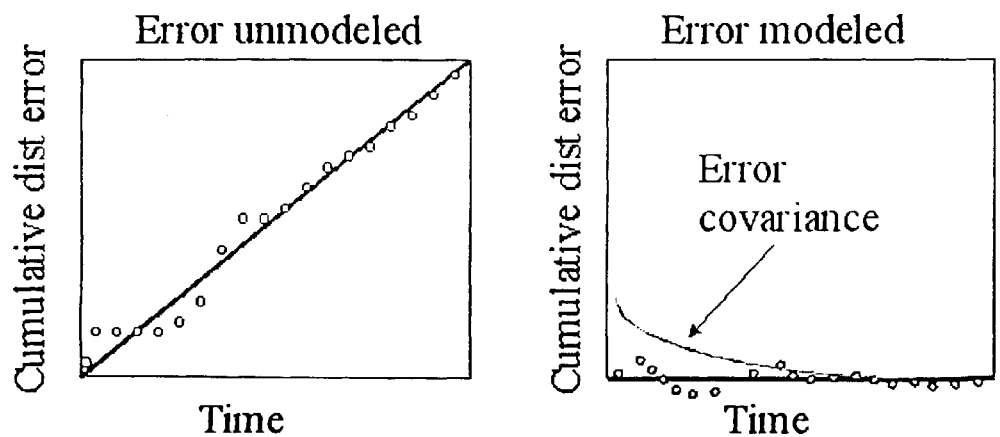
FIG. 3 is a graphical illustration showing a reduction of elapsed distance error according to principles of the present invention.

FIG. 3 represents the cumulative error growth in elapsed distance due to the influence of the distance divergence. On the left hand side is the error growth without the $\Delta d$ correction factor and on the right is after the correction factor has been applied to the incremental differences. These incremental differences could have been determined by employing the preferred or first alternative embodiment described above, or through another method known in the art.

The covariance matrix is influenced by the error sources described above. The initial covariance matrix is set assuming environmental parameters. If a good description of the environment is available (i.e., tall buildings leading to large multipath; no ionospheric storms; etc.) then these can be used to establish the correct initial covariance (i.e., uncertainty) matrix. The value of $C_D$ will mostly be dependent on the receiver and can be programmed during the manufacturing process.

The models are built into the receiver device at manufacture time or, alternatively, uploaded at a later time. Examples of effects that can be incorporated at the time of manufacturing are preset initial covariance for different environments (e.g., tall buildings, suburban residential, rural, etc.) and a $C_D$ for the particular type of the receiver. If uploaded at a later time, the model parameters can enable the receiver device to account for variations that could not be anticipated at the time of manufacture such as atmospheric variations.

Although the invention has been described in terms of the illustrative embodiments, it will be appreciated by those skilled in the art that various changes and modifications may be made to the illustrative embodiments without departing from the spirit or scope of the invention. It is intended that the scope of the invention not be limited in any way to the illustrative embodiments shown and described but that the invention be limited only by the claims appended hereto.

What is claimed is:

1. A computer system for storing information, the system comprising:
    a processor; and
    a memory coupled to the processor, the memory configured to store a plurality of code modules for execution by the processor, the plurality of code modules comprising:
        a code module for receiving pseudorange data, said pseudorange data comprising one of pseudorange differences or range rates, said pseudorange differences comprising a difference between a first pseudorange and a second pseudorange, said first pseudorange comprising the pseudorange between a mobile GPS receiver and a GPS satellite at a first epoch of a plurality of epochs, said second pseudorange comprising the pseudorange between said receiver and said GPS satellite at a second epoch of said plurality of epochs, said range rates comprising a range rate measurement taken by said receiver of said GPS satellite from said first epoch to said second epoch;
        a code module for determining line-of-sight data, said line-of-sight data comprising at least one normalized vector between said receiver and said GPS satellite;
        a code module for determining, based on said pseudorange and line-of-sight data, incremental distance data, said determining incremental distance data comprising determining a linear algebraic solution of said pseudorange and line-of-sight data, said linear algebraic solution determination yielding one of receiver position difference data or three-dimensional velocity data, said determining incremental distance data further comprising determining a root mean square of said receiver position difference data or three-dimensional velocity data, said linear algebraic solution comprising a pseudoinverse; and
        a code module for determining a sum over an event of said incremental distance data, said event comprising said first and second epochs.

2. The system of claim 1, wherein said determining incremental distance data further comprises determining a product of a time interval and said root mean square of said three-dimensional velocity data, said time interval comprising the elapsed time between said first and second epochs.

3. A computer system for storing information, the system comprising:
    a processor; and
    a memory coupled to the processor, the memory configured to store a plurality of code modules for execution by the processor, the plurality of code modules comprising:
        a code module for receiving pseudorange data;
        a code module for determining line-of-sight data;
        a code module for determining, based on said pseudorange and line-of-sight data, incremental distance data; and
        a code module for determining a sum over an event of said incremental distance data,
    wherein said pseudorange data comprises pseudorange differences, and
    wherein said pseudorange differences comprise a difference between a first pseudorange and a second pseudorange, said first pseudorange comprising the pseudorange between a mobile GPS receiver and a GPS satellite at a first epoch of a plurality of epochs, said second pseudorange comprising the pseudorange between said receiver and said GPS satellite at a second epoch of said plurality of epochs.

4. The system of claim 3, wherein said line-of-sight data comprises at least one normalized vector between a mobile GPS receiver and a GPS satellite.

5. The system of claim 3, wherein said event comprises a first epoch of a plurality of epochs and a second epoch of said plurality of epochs.

6. A computer system for storing information, the system comprising:
- a processor; and
- a memory coupled to the processor, the memory configured to store a plurality of code modules for execution by the processor, the plurality of code modules comprising:
  - a code module for receiving pseudorange data;
  - a code module for determining line-of-sight data;
  - a code module for determining, based on said pseudorange and line-of-sight data incremental distance data; and
  - a code module for determining a sum over an event of said incremental distance data,
- wherein said determining incremental distance data comprises determining a linear algebraic solution of said pseudorange and line-of-sight data,
- wherein said linear algebraic solution determination yields receiver position difference data, and
- wherein said determining incremental distance data further comprises determining a root mean square of said receiver position difference data.

7. The system of claim 6, wherein said linear algebraic solution determination yields three-dimensional velocity data.

8. The system of claim 6, wherein said linear algebraic solution comprises a pseudoinverse.

9. The system of claim 6, wherein said determining incremental distance data further comprises determining a root mean square of said three-dimensional velocity data.

10. A computer system for storing information, the system comprising:
- a processor; and
- a memory coupled to the processor, the memory configured to store a plurality of code modules for execution by the processor, the plurality of code modules comprising:
  - a code module for receiving pseudorange data;
  - a code module for determining line-of-sight data;
  - a code module for determining, based on said pseudorange and line-of-sight data, incremental distance data; and
  - a code module for determining a sum over an event of said incremental distance data,
- wherein said determining incremental distance data comprises determining a linear algebraic solution of said pseudorange and line-of-sight data,
- wherein said linear algebraic solution determination yields three-dimensional velocity data,
- wherein said determining incremental distance data further comprises determining a root mean square of said three-dimensional velocity data, and
- wherein said determining incremental distance data further comprises determining a product of a time interval and said root mean square of said three-dimensional velocity data.

11. The system of claim 10, wherein said time interval comprises the elapsed time between a first epoch of a plurality of epochs and a second epoch of said plurality of epochs.

12. A method of determining the distance traveled during an event by a mobile GPS receiver, the event comprising a plurality of epochs, the method comprising:
- receiving pseudorange data, said pseudorange data comprising one of pseudorange differences or range rates, said pseudorange differences comprising a difference between a first pseudorange and a second pseudorange, said first pseudorange comprising the pseudorange between the receiver and a GPS satellite at a first epoch of the plurality of epochs, said second pseudorange comprising the pseudorange between the receiver and said GPS satellite at a second epoch of the plurality of epochs, said range rates comprising a range rate measurement taken by the receiver of said GPS satellite from said first epoch to said second epoch;
- determining line-of-sight data, said line-of-sight data comprising at least one normalized vector between the receiver and said GPS satellite;
- determining, based on said pseudorange and line-of-sight data, incremental distance data, said determining incremental distance data comprising determining a linear algebraic solution of said pseudorange and line-of-sight data, said linear algebraic solution determination yielding one of receiver position difference data or three-dimensional velocity data, said determining incremental distance data further comprising determining a root mean square of said receiver position difference data or three-dimensional velocity data; and
- determining a sum over the event of said incremental distance data.

13. The system of claim 12, wherein said determining incremental distance data further comprises determining a product of a time interval and said root mean square of said three-dimensional velocity data, said time interval comprising the elapsed time between said first and second epochs.

14. A method of determining the distance traveled during an event by a mobile GPS receiver, the event comprising a plurality of epochs, the method comprising:
- receiving pseudorange data;
- determining line-of-sight data;
- determining, based on said pseudorange and line-of-sight data, incremental distance data; and
- determining a sum over the event of said incremental distance data,
- wherein said pseudorange data comprises pseudorange differences, and
- wherein said pseudorange differences comprise a difference between a first pseudorange and a second pseudorange, said first pseudorange comprising the pseudorange between the receiver and a GPS satellite at a first epoch of the plurality of epochs, said second pseudorange comprising, the pseudorange between the receiver and said GPS satellite at a second epoch of the plurality of epochs.

15. The method of claim 14, wherein said line-of-sight data comprises at least one normalized vector between the receiver and a GPS satellite.

16. The method of claim 15, wherein said line-of-sight data comprises at least one normalized vector between the receiver and a GPS satellite.

17. A method of determining the distance traveled during an event by a mobile GPS receiver, the event comprising a plurality of epochs, the method comprising:
- receiving pseudorange data;
- determining line-of-sight data;

determining, based on said pseudorange and line-of-sight data, incremental distance data; and determining a sum over the event of said incremental distance data, wherein said determining incremental distance data comprises determining a linear algebraic solution of said pseudorange and line-of-sight data, wherein said linear algebraic solution determination yields receiver position difference data, and wherein said determining incremental distance data further comprises determining a root mean square of said receiver position difference data.

18. The method of claim 17, wherein said linear algebraic solution determination yields three-dimensional velocity data.

19. The method of claim 17, wherein said linear algebraic solution comprises a pseudoinverse.

20. A method of determining the distance traveled during an event by a mobile GPS receiver, the event comprising a plurality of epochs, the method comprising:

receiving pseudoranie data;

determining line-of-sight data;

determining, based on said pseudorange and line-of-sight data, incremental distance data; and determining a sum over the event of said incremental distance data, wherein said determining incremental distance data comprises determining a linear algebraic solution of said pseudorange and line-of-sight data, wherein said linear algebraic solution determination yields three-dimensional velocity data, and wherein said determining incremental distance data further comprises determining a root mean square of said three-dimensional velocity data.

21. The method of claim 20, wherein said determining incremental distance data further comprises determining a product of a time interval and said root mean square of said three-dimensional velocity data.

22. The method of claim 21, wherein said time interval comprises the elapsed time between said first and second epochs of the plurality of epochs.

\* \* \* \* \*